United States Patent
Horng

(10) Patent No.: US 7,039,369 B2
(45) Date of Patent: May 2, 2006

(54) TRANSMIT DIVERSITY GAIN FOR WIRELESS COMMUNICATIONS NETWORKS

(75) Inventor: Jyhchau Horng, Warren, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 412 days.

(21) Appl. No.: 10/698,104

(22) Filed: Oct. 31, 2003

(65) Prior Publication Data

US 2005/0095997 A1    May 5, 2005

(51) Int. Cl.
*H04B 1/02* (2006.01)
*H04L 27/04* (2006.01)

(52) U.S. Cl. .................. 455/101; 455/562.1; 375/299

(58) Field of Classification Search ............... 455/91, 455/101, 127.1, 127.2, 561, 562.1; 375/259, 375/260, 267, 295, 299
See application file for complete search history.

(56) References Cited

U.S. PATENT DOCUMENTS

| | | | |
|---|---|---|---|
| 6,088,408 A * | 7/2000 | Calderbank et al. | 375/347 |
| 6,560,295 B1 * | 5/2003 | Hammons et al. | 375/299 |
| 6,862,434 B1 * | 3/2005 | Wallace et al. | 455/101 |
| 6,959,047 B1 * | 10/2005 | Al-Dhahir et al. | 375/267 |

OTHER PUBLICATIONS

S. Zhou, G.B. Giannakis, "Optimal transmitter eigen-beamforming and space-time block coding based on channel mean feedback," IEEE Trans. Signal Processing, vol. 50, pp. 2599-2613, Oct., 2002.

3GPP Standard document, TR 25.869, "Transmitter diversity solutions for multiple antennas."

J.H. Horng, L. Li, and J. Zhang, "Adaptive space-time transmit diversity for MIMO systems," In Proc. IEEE Veh. Techno. Conf. VTC '03 Spring, pp. 1070-1073, Apr. 2003.

Valaee, et al., "Resource Allocation for Video Streaming in Wireless Environment," IEEE International Symposium on Wireless Personal Multimedia Communications (WPMC 02), Oct. 2002.

* cited by examiner

*Primary Examiner*—Quochien B. Vuong
(74) *Attorney, Agent, or Firm*—Dirk Brinkman; Andrew J. Curtin

(57) ABSTRACT

A method and system that increases transmit diversity gain in a wireless communication system. The system includes a transmitter with $2^N$ transmit antennas, where N is greater than one, and a receiver with one or more receive antenna. The transmitter includes N stages connected serially to each other. The first stage is a symbol level space-time transmit diversity encoder. Each of the next N−1 stages is a block level space-time transmit diversity encoder, for a total of N stages. The last stage is connected to the $2^N$ antennas. The transmitter generates pairs of symbols in a form $X_1$ and $X_2$. The pairs of symbols are encoded by the first stage to produce a $2^1 \times 2^1$ output matrix C. Then, in each next block level stage n, the $2^{n-1} \times 2^{n-1}$ output matrix of a previous stage is encoded to a $2^n \times 2^n$ output matrix, until a final output matrix has $2^N$ rows of transmit symbols. The transmit symbols of the final output matrix are fed, in a left-to-right order, for each row, in a top-to-bottom order, to a corresponding different one of the $2^N$ transmit antennas. A transmit weight is applied to each transmit symbol before transmitting the transmit symbol.

10 Claims, 3 Drawing Sheets

100

US 7,039,369 B2

TRANSMIT DIVERSITY GAIN FOR WIRELESS COMMUNICATIONS NETWORKS

FIELD OF THE INVENTION

This invention relates generally to wireless communication networks, and more particularly to adaptive transmit diversity in such networks.

BACKGROUND OF THE INVENTION

Transmit diversity is one of the key technologies that define third generation wireless communication systems, such as cellular telephone networks. In such systems, spatial diversity is introduced into the signal by transmitting the signal through multiple antennas. Spatial diversity reduces the effects of channel fading by providing multiple independent copies of the signal at the receiver. With transmit diversity, the probability that all copies fade simultaneously in the channel is very small. As a result, the system performance is improved.

Transmit diversity can use multiple spatially separated antennas, as well as various temporal or frequency modulation techniques, or combinations of these techniques.

Space time transmit diversity (STTD) is an open loop transmit diversity technique. STTD has been adopted by the $3^{rd}$ generation partnership project (3GPP) for wideband code division multiple access (W-CDMA) standards. Open loop means that there is no feedback about channel conditions from the receiver to the transmitter.

FIG. 1 shows a basic structure of a conventional STTD system 100. The system uses two transmit antennas 103, and one receive antenna 104. In such a system, the transmitter generates a stream of data to be transmitted as pairs of symbols $X_1$ and $X_2$ 110. Each pair of symbols is fed to a symbol level STTD encoder block 101 of the transmitter. An output matrix 111 of the encoder 101 is $$C_1 = \begin{bmatrix} X_1 & X_2 \\ X_2^* & -X_1^* \end{bmatrix}, \quad (1)$$

where * denotes a complex conjugate. Transmit symbols, in a left-to-right order, of the rows, in a top-to-bottom order, are fed to the corresponding different transmit antennas, as shown in FIG. 1. That is, the transmit symbols $X_1$, $X_2$ of the first row all go to the first transmit antenna, and the transmit symbols $X_2^*$, $-X_1^*$ of the second row all go to the second transmit antenna.

After passing through a wireless channel 115, the channel impulse responses $h_1$ and $h_2$ 118 are detected and measured by the decoder 102 having a single antenna 104.

In general, this type of transformation maximizes the diversity gain in the case of two transmit antennas. Because the diversity gain is proportional to the number of transmit antennas, a higher number of transmit antennas are required to achieve higher diversity gains and to improve the performance of the system.

This is especially true in a downlink channel because a base station can typically incorporate a large number of transmit antennas. However, the 3GPP W-CDMA standards for the STTD scheme limits the transmitter to two transmit antennas. Therefore, any other transmit diversity technique for 3GPP, with a larger number of antennas, must achieve backward compatibility with systems with two transmit antennas.

Therefore, it is desired to provide STTD transmitters with more than two transmit antennas, while achieving backward compatibility with prior art two antenna 3GPP W-CDMA systems.

SUMMARY OF THE INVENTION

A method and system increases transmit diversity gain in a wireless communication system. The system includes a transmitter with $2^N$ transmit antennas, where N is greater than one, and a receiver with one or more receive antenna. The transmitter includes N stages connected serially to each other.

The first stage is a symbol level space-time transmit diversity encoder.

Each of the next N−1 stages is a block level space-time transmit diversity encoder, for a total of N stages. The last stage is connected to the $2^N$ antennas.

The transmitter generates pairs of symbols in a form $X_1$ and $X_2$. The pairs of symbols are encoded by the first stage to produce a $2^1 \times 2^1$ output matrix C.

Then, in each next block level stage n, the $2^{n-1} \times 2^{n-1}$ output matrix of a previous stage is encoded to a $2^n \times 2^n$ output matrix, until a final output matrix has $2^N$ rows of transmit symbols.

The transmit symbols of the final output matrix are fed, in a left-to-right order, for each row, in a top-to-bottom order, to a corresponding different one of the $2^N$ transmit antennas. A transmit weight is aplied to each transmit symbol before transmitting the transmit symbol.

DETAILED DESCRIPTION OF THE PREFERRED EMBODIMENT

Figure 2:
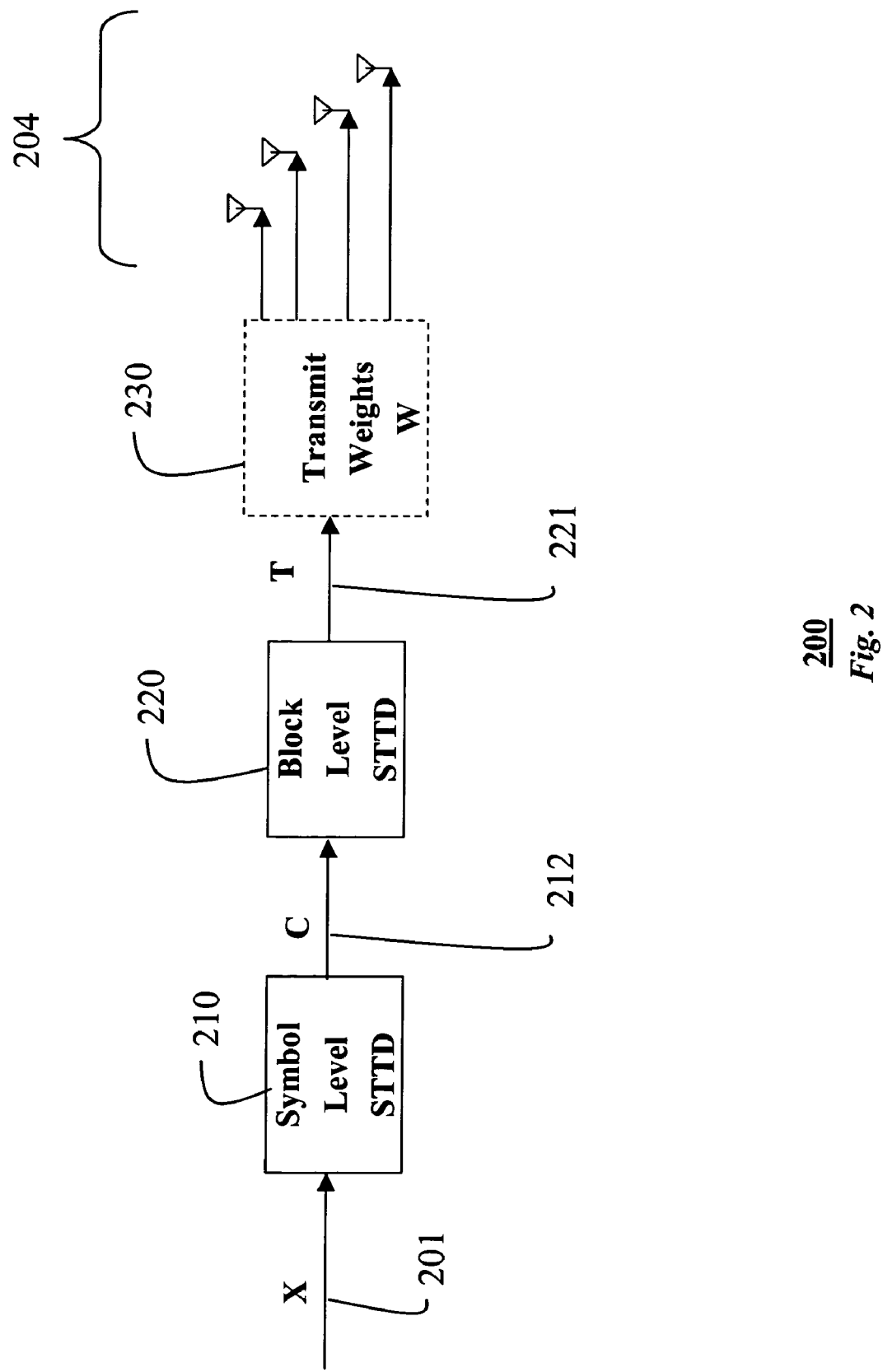
FIG. 2 is a block diagram of a STTD transmitter with $2^N$ transmit antennas according to the invention.

As shown in FIG. 2, the invention provides a transmitter 200 with $2^N$ transmit antennas 201, where N is an integer value greater than one. This is an extension of the prior art STTD transmitter with two antennas, i.e. N equals one. For the example transmitter in FIG. 2, N equals two, so there are four transmit antennas 204.

Figure 1:
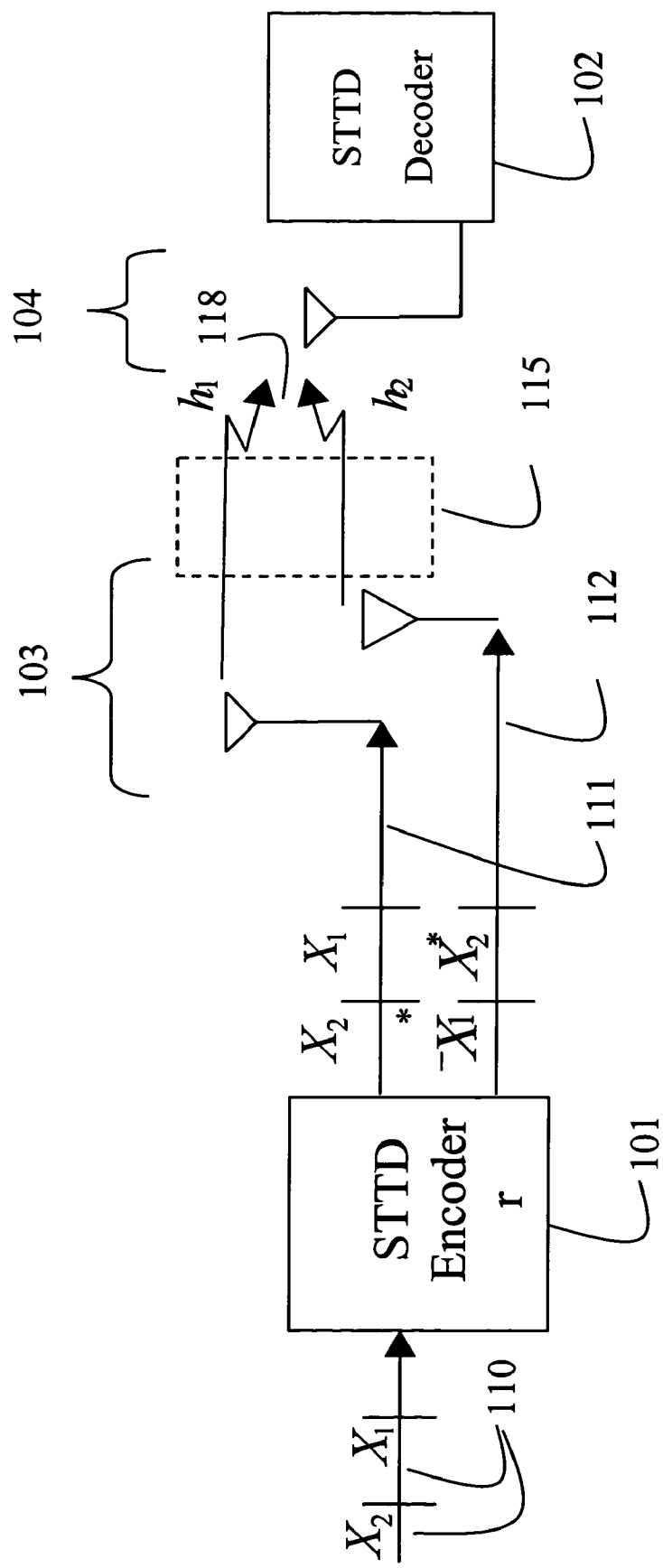
FIG. 1 is a block diagram of a prior art STTD system with two transmit antennas and one receive antenna.

In order to be backward compatible with the prior art STTD system of FIG. 1, a transmit signal is generated as a stream of pairs of symbols. Each pair of symbols is denoted generally by X 110. Each pair of symbols is first encoded by a symbol level STTD encoder 210 as a matrix C 212 with two rows.

According to the invention, a pair of consecutive symbol pairs $(X_1, X_2)$ and $(X_3, X_4)$ encode 210 to a pair of matrices $C_1$ and $C_2$ $$C_1 = \begin{bmatrix} X_1 & X_2 \\ X_2^* & -X_1^* \end{bmatrix} \text{ and } C_2 = \begin{bmatrix} X_3 & X_4 \\ X_4^* & -X_3^* \end{bmatrix}. \quad (2)$$

Next, a 4×4 matrix of transmit symbols T 221 are generated for the four antennas 204 from each pair of matrices $C_1$ and $C_2$ by a block level encoder 220. That is, each matrix C is treated as an element for the block level STTD encoding operation 220.

As a result of the block level encoding 220, the matrix T 221 is $$T_1 = \begin{bmatrix} C_1 & C_2 \\ C_2^* & -C_1^* \end{bmatrix} = \begin{bmatrix} X_1 & X_2 & X_3 & X_4 \\ X_2^* & -X_1^* & X_4^* & -X_3^* \\ X_3^* & X_4^* & -X_1^* & -X_2^* \\ X_4 & -X_3 & -X_2 & X_1 \end{bmatrix}. \quad (3)$$

Transmit symbols, in a left-to-right order, of each row of the matrix T 221, in a top-to-bottom order, are fed to the corresponding different transmit antennas 204. That is, the transmit symbols $X_1, X_2, X_3, X_4$ go to the first antenna, and the transmit symbols $X_2^*, -X_1^*, X_4^*, -X_3^*$ to the second antenna, and so forth.

As further shown in FIG. 2, the performance of the system can be further improved by applying optional weights 230 to each transmit symbol. The weight at the $i^{th}$ antenna is denoted by $W_i$ for $i=1, 2, \ldots, 2^N$. The value of $W_i$ is based on channel conditions.

Some techniques to determine the transmit weights are addressed in the literature. The most commonly used techniques are the water-filling algorithm and eigen-mode algorithm, see Valaee et al., "Resource Allocation for Video Streaming in Wireless Environment," IEEE International Symposium on Wireless Personal Multimedia Communications (WPMC 02), October 2002. Both techniques select the transmit weights based on the channel conditions. If maximum received signal-to-noise ratio at each receive antenna is desired, then the eigen-mode algorithm is favorable.

The channel conditions can be estimated or measured in a receiver and fed back to the transmitter. In the case the channel condition is fed back, then the the system operates in closed loop, which is different from a conventional STTD system. However, if identical real-value weights are applied at each transmit antenna, then backward compatibility is maintained.

Figure 3:
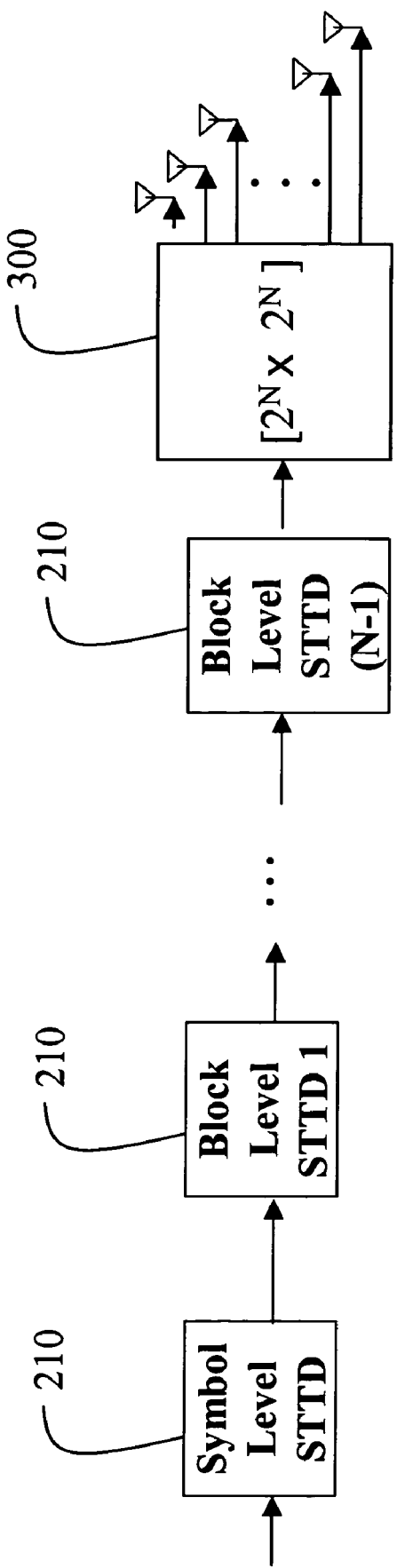
FIG. 3 is a block diagram of block level STTD encoders connected serially.

As shown in FIG. 3, this process and structure can be generalized for $N=2, \ldots, n, \ldots, N$, i.e., four, eight, sixteen, etc., transmit antennas by adding $(N-1)$ block level STTD encoding blocks 220, connected serially, after the symbol level STTD encoder 210.

During each next block level STTD operation, each pair of matrices from an ouput of a previous encoding stage is treated as an input element in the subsequent block level STTD encoding. The resulting $2^N \times 2^N$ output matrix 300 is a final encoding matrix for transmission. Transmit symbols of the rows of the final matrix 300 are fed to the $2^N$ antennas, in a top-to-bottom order, as shown.

It is noted that the pairs of transmit symbols taken from the two top rows of the encoding matrix in equation (3) are identical to the output of the symbol level STTD 210, no matter how many block level STTD blocks are added. Therefore the backward compatibility with priot art two antenna STTD transmitters is achieved.

Therefore, a prior art receiver can process the received signal without having to know the number of encoding stages that were used by the transmitter. However, if the receiver is aware that in addition to the single symbol level encoding stage, one or more block level encoding stages were also used, then the increased diversity gain due to those additional stage can provide better performance.

It should be noted that the diversity gain can be further improved by increasing the number of antennas at the receiver.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

I claim:

1. A method for increasing transmit diversity gain in a wireless communication system including a transmitter with $2^N$ transmit antennas, where N is greater than one, and a receiver with one receive antenna, comprising:

generating, in the transmitter, a stream of pairs of symbols in a form $X_1$ and $X_2$;

space-time transmit diversity encoding each pair of symbols at a symbol-level stage to produce a $2^1 \times 2^1$ matrix $$C = \begin{bmatrix} X_1 & X_2 \\ X_2^* & -X_1^* \end{bmatrix}$$

for each pair, where * denotes a complex conjugate; and space-time transmit diversity coding each pair of $2^1 \times 2^1$ matrices C of the previous state in a next stage at a block level to produce a $2^2 \times 2^2$ output matrix $$T = \begin{bmatrix} C_1 & C_2 \\ C_2^* & -C_1^* \end{bmatrix} = \begin{bmatrix} X_1 & X_2 & X_3 & X_4 \\ X_2^* & -X_1^* & X_4^* & -X_3^* \\ X_3^* & X_4^* & -X_1^* & -X_2^* \\ X_4 & -X_3 & -X_2 & X_2 \end{bmatrix};$$

feeding transmit symbols of the output matrix T, in a left-to-right order, of each row, in a top-to-bottom order, to a corresponding different transmit antennas.

2. The method of claim 1, further comprising:

applying a transmit weight to each transmit symbol before transmitting the transmit symbol.

3. The method of claim 2, in which the transmit weight is based on channel conditions.

4. The method of claim 3, in which the channel condition is estimated by the transmitter.

5. The method of claim 3, further comprising:

measuring the channel conditions in a receiver of the transmit symbols; and feeding back the channel condition to the transmitter.

6. The method of claim 1, in which the transmit weights are identical.

7. The method of claim 1, in which a receiver has a plurality of receive antennas.

8. The method of claim 1, further comprising:

repeatedly space-time transmit diversity coding each pair of $2^{n-1} \times 2^{n-1}$ matrices of the previous state n-1 in a next stage n at the block level to produce a $2^n \times 2^n$ output matrix $$T = \begin{bmatrix} C_1 & C_2 \\ C_2^* & -C_1^{*1} \end{bmatrix} = \begin{bmatrix} X_1 & X_2 & X_3 & X_4 \\ X_2^* & -X_1^* & X_4^* & -X_3^* \\ X_3^* & X_4^* & -X_1^* & -X_2^* \\ X_4 & -X_3 & -X_2 & X_2 \end{bmatrix},$$

until a number of rows in a final output matrix is equal to $2^N$.

9. A wireless transmitter including $2^N$ transmit antennas, where N is greater than one, comprising:

means for generating a stream of pairs of symbols in a form $X_1$ and $X_2$;

a space-time transmit diversity encoder configured to encode each pair of symbols at a symbol-level stage to produce a $2^1 \times 2^1$ matrix $$C = \begin{bmatrix} X_1 & X_2 \\ X_2^* & -X_1^* \end{bmatrix},$$

where * denotes a complex conjugate; and a plurality of space-time transmit diversity encoders, connected serially, configured to encode each pair of $2^{n-1} \times 2^{n-1}$ matrices of the previous state n−1 in a next stage n at a block level to produce a $2^n \times 2^n$ output matrix; and means for feeding transmit symbols of an output matrix of a last stage of the plurality of encoders, in a left-to-right order, of each row, in a top-to-bottom order, to a corresponding different one of $2^N$ transmit antennas.

10. A wireless transmitter, comprising:

$2^N$ transmit antennas, where N is greater than one;

means for generating a stream of pairs of symbols;

one symbol level space-time transmit diversity encoder generating a first output matrix from each pair of symbols in the stream;

N−1 block level space-time transmit diversity encoders connected serially to each other and a first one of the block level space-time transmit diversity encoders is connected to the one symbol level space-time transmit diversity encoder, each block level space-time transmit diversity encoder generating a subsequent output matrix from pairs of output matrices of a previous encoder; and wherein a last encoder generates a $2^N \times 2^N$ output matrix; and feeding transmit symbols of the last output matrix, in a left-to-right order, of each of N rows, in a top-to-bottom order, to a corresponding different one of the $2^N$ transmit antennas.

* * * * *